Patented Jan. 10, 1939

2,143,805

UNITED STATES PATENT OFFICE 2,143,805

CALCINING COPPERAS

Benjamin A. Smith, Rocky River, Ohio, assignor to The C. O. Bartlett & Snow Company, Cleveland, Ohio, a corporation of Ohio No Drawing. Application June 23, 1938, Serial No. 215,512

4 Claims. (Cl. 23—126)

This invention relates as indicated to calcining and more particularly to the process of calcining ferrous sulphate which is commercially known as "copperas" and will be, for convenience, thus identified throughout the following description of my invention.

The normal blue-green copperas crystals crystallized out of a solution of the same have the formula $FeSO_4.7H_2O$.

This invention has for its principal object a process of calcining copperas so as to remove a major proportion of the water of crystallization so as to produce an end product having four or less molecules of water of crystallization.

When the copperas crystals with seven molecules of water of crystallization combined therewith are heated even gently, some of these molecules of water of crystallization are liberated and the crystals begin to decompose and decrepitate. If heat be applied fairly strongly, the liberation of the water molecules is at such a rapid rate that the remaining salt forms a mush with the water thus liberated. Such a mush, if formed, is exceedingly difficult to handle in any commercial form of calcining. It is exceedingly adhesive and when dry forms a hard cement-like compound. This mush also has a tendency to adhere to the walls of the calcining vessel and the proportion of the same which does not thus adhere to the walls of the vessel forms balls and pellets which are very difficult to calcine further. Uniform calcinization of the material under conditions where a mush is formed is practically impossible.

Efforts have been made in the prior art to calcine copperas in such a way as to avoid the formation of this objectionable mush. The principal expedient which has been tried has been to recirculate through the calciner some of the partially calcined material in order that the same may act as an absorbing medium for the water liberated from the freshly introduced crystals so as to prevent the entire mass being reduced to a mush. This process of recirculating the portion of the calcined material has three principal objections:—

1. The equipment necessary to accomplish this recirculation is cumbersome and expensive;

2. The capacity of any given size of calcining equipment is lowered by the amount which is recirculated; and 3. When calcining to produce a product having two or less molecules of residual water of crystallization, the product is dusty and such dust is hard to retain in the apparatus and if it lodges on bright ferrous metal surfaces, it tends to corrode and rust the same. Moreover, since commercial copperas is a product of relatively low market price, it is most desirable that the calcining process be carried out as a single stage process and preferably by the direct application of heat thereto such as is provided by low cost fuels such as coal, gas, oil and the like.

It is further, a more particular object of my invention, therefore, to provide a process of calcining copperas characterized in that it has none of the objections above referred to but which is capable of economically producing an end product of desirable amorphous character and having a combined water of crystallization of four or less molecules of water and down to one molecule of water of cystallization.

To the accomplishment of the foregoing and related ends, said invention then consists of the steps hereinafter fully described and particularly pointed out in the claims; the following description setting forth in detail one approved method of carrying out the invention, such disclosed method, however, constituting but one of various ways in which the principle of the invention may be used.

Broadly stated, this invention comprises the process of passing the copperas and hot combustion gases in counterflow relation through conventional apparatus such as a rotary drier while maintaining a critical temperature gradient between the gases and the material for a predetermined length of time.

*The apparatus*

Any suitable form of calcining apparatus may be employed in carrying out my invention. A rotary calciner or kiln, a rotary drier, a Herreschoff furnace or a Wedge furnace may be employed. If the critical temperature gradient between the hot combustion gases and the material being treated is maintained for the specified time as hereinafter explained, the process comprising my invention may be carried out in any of the above forms of commercially available apparatus, the construction and operation of which is well known to those familiar with the art so that a further description of the same should not be necessary.

*The combustion gases*

The combustion gases or treating gases which are employed in carrying out my process by being led through any of the aforementioned conventional forms of calciners in counter-flow relation to the material being treated may be such as are produced by the combustion of any conventional fuels such as coal, gas, oil, etc. It is thus possible to carry on the process comprising my invention with relatively inexpensive fuel directly applied to the treating apparatus, thus further reducing the total cost of carrying on the process.

*The temperature gradient between the treating gases and the copperas*

I have found that in order to successfully carry out my invention so that the water of crystallization will be gradually removed from the crystals of copperas without such an excessive liberation of water as will result in the formation of a mush, a critical control must be exercised over the temperature gradient between the treating gases and the material being treated. This thermal gradient depends in some degree on the type of apparatus employed.

When a conventional rotary drier is employed within which the process of my invention is carried on, it is essential that the entering temperature of the hot combustion gases lie between 300° F. and 500° F. while the exit temperatures of the spent and cooled combustion gases must lie between about 125° F. and 140° F.

One form of rotary drier suitable for the purpose of carrying on my invention is a direct fired countercurrent rotary type drier manufactured and sold by The C. O. Bartlett and Snow Company, of Cleveland, Ohio, and has a cylinder of 72" inside diameter, 40' long, arranged at a slope to the horizontal of approximately 0.18" per foot and rotated at a speed of from 1 to 3 R. P. M.

If the hot gases entering the calciner are heated much in excess of 500° F., an inferior hard product is produced which usually has a composition of 1½ to 2 molecules of water of crystallization. If the hot gases enter at a temperature substantially lower than 300° F., it is difficult, if not impossible, to produce in any appreciable quantity and under any reasonable control a product having below two molecules of water of crystallization.

*Time*

Time is an important factor in the process of calcining comprising my invention. Sufficient time must be given at a particular temperature gradient between the treating gases and the copperas crystals for the water as it is liberated within the crystals due to a heating of the same, to move by capillary action to the surface thereof and to be there evaporated at a rate which is such that the liberated water will not reduce the crystals to a mush.

It will be found that in an apparatus of the character above described, one hour of treatment will produce a product having approximately two molecules of residual water of crystallization and if such time is extended to about 1½ hours, a product will result which has approximately one molecule of residual water of crystallization.

All of the foregoing critical conditions have been established when the apparatus is operated at a room temperature of about 70° F.

Under the influence of the critical temperature gradient as above defined, the copperas introduced into the calciner is first dried of any free water and then gradually heated in such a manner that the crystal faces begin to lose a portion of their water of crystallization. The gradual and slow increase of heat penetration causes further liberation of water of crystallization but only at such a restrained rate that the water thus liberated will, by capillary action, flow to the porous exterior of the crystals to be there removed by treating gases at a sufficiently rapid rate to prevent such liberated water from forming a mush.

The humidity of the products of combustion in passing over the crystals which are in the course of losing their water of crystallization, as above explained, is such that the water coming to the surface of the crystals is quickly evaporated. The final result is an amorphous particle having substantially the shape and size of the original copperas crystal but having a definite desirable composition of four or less molecules of water of crystallization.

The product resulting from the process comprising my invention will be found to be a soft amorphous mass which may be readily crushed to a fine powder. If a particle of the end product of my process is placed on a glass plate and crushed with a steel spatula, a soft fluffy powder will be produced which does not possess the grittiness which characterizes products of the prior art process when examined in a similar fashion.

Other modes of applying the principle of my invention may be employed instead of the one explained, change being made as regards the process herein disclosed, provided the step or steps stated by any of the following claims or the equivalent of such stated step or steps be employed.

I, therefore, particularly point out and distinctly claim as my invention:—

1. The continuous process of removing water of crystallization from copperas which comprises continuously moving streams of copperas and heated treating gases in counterflow relation through a treating zone, the copperas entering such zone containing on the order of about 7 molecules of water of crystallization ($FeSO_4.7H_2O$) and when leaving said zone containing an average of not more than 4 molecules of water of crystallizatio ($FeSO_4.4H_2O$), the temperature and rate of flow of the heated treating gases passing through said zone being so regulated that the gas stream enters said zone and contacts the substantially dehydrated copperas at between 300° F. and 500° F. and leaves the treating zone, where it contacts the untreated copperas, at between 125° F. and 140° F. such copperas being initially in the form of crystals and finally in the form of discrete particles and maintained in unfused condition during passage through the treating zone.

2. The continuous process of removing water of crystallization from copperas which comprises continuously moving streams of copperas and heated treating gases in counterflow relation through a treating zone, the copperas entering such zone containing on the order of about 7 molecules of water of crystallization ($FeSO_4.7H_2O$), and when leaving said zone containing not more than the equivalent of 1 molecule of water of crystallization ($FeSO_4.H_2O$), the temperature and rate of flow of the heated treating gases passing through said zone being so regulated that the temperature of the gas stream enters said zone and contacts the substantially dehydrated copperas at between 300° F. and 500° F. and leaves the treating zone, where it contacts the untreated copperas, at between 125° F. and 140° F. such copperas being initially in the form of crystals and finally in the form of discrete particles and maintained in unfused condition during passage through the treating zone.

3. The continuous process of removing water of crystallization from copperas which comprises continuously moving streams of copperas and heated treating gases in counterflow relation through a treating zone, the copperas entering such zone containing on the order of about 7 molecules of water of crystallization ($FeSO_4.7H_2O$), and when leaving said zone containing an average of not more than 4 molecules of water of crystallization ($FeSO_4.4H_2O$), the temperature and rate of flow of the heated treating gases passing through said zone being so regulated that the gas stream enters said zone and contacts the substantially dehydrated copperas, at between 300° F. and 500° F. and leaves the treating zone, where it contacts the untreated copperas, at between 125° F. and 140° F., the rate of flow of the copperas being such that a period of about one hour is required for it to pass through said treating zone such copperas being initially in the form of crystals and finally in the form of discrete particles and maintained in unfused condition during passage through the treating zone.

4. The continuous process of removing water of crystallization from copperas which comprises continuously moving streams of copperas and heated treating gases in counterflow relation through a treating zone, the copperas entering such zone containing on the order of about 7 molecules of water of crystallization ($FeSO_4.7H_2O$), and when leaving said zone containing not more than the equivalent of 1 molecule of water of crystallization ($FeSO_4.H_2O$), the temperature and rate of flow of the heated treating gases passing through said zone being so regulated that the gas stream enters said zone and contacts the substantially dehydrated copperas, at between 300° F. and 500° F. and leaves the treating zone, where it contacts the untreated copperas, at between 125° F. and 140° F., the rate of flow of the copperas being such that a period of about one and one-half hours is required for it to pass through said treating zone such copperas being initially in the form of crystals and finally in the form of discrete particles and maintained in unfused condition during passage through the treating zone.

BENJAMIN A. SMITH.